(12) United States Patent
Bloemen

(10) Patent No.: US 6,914,976 B2
(45) Date of Patent: Jul. 5, 2005

(54) TELECOMMUNICATIONS CUSTOMER SERVICE TERMINAL HAVING ELECTRONIC COMPONENTS SEALED IN A FIRST COMPARTMENT AND HAVING AN UNSEALED COMPARTMENT THAT CONTAINS AN INSULATION DISPLACEMENT CONNECTOR BOARD THAT INCLUDES VOLTAGE SURGE PROTECTION

(75) Inventor: James Andrew Bloemen, Highlands Ranch, CO (US)

(73) Assignee: Carrier Access Corporation, Boulder, CO (US)

( * ) Notice: Subject to any disclaimer, the term of this patent is extended or adjusted under 35 U.S.C. 154(b) by 421 days.

(21) Appl. No.: 10/103,577

(22) Filed: Mar. 21, 2002

(65) Prior Publication Data

US 2002/0141566 A1 Oct. 3, 2002

Related U.S. Application Data

(60) Provisional application No. 60/279,910, filed on Mar. 29, 2001.

(51) Int. Cl.$^7$ ................................................ H04M 3/00
(52) U.S. Cl. ....................... 379/325; 379/330; 379/331; 361/118
(58) Field of Search ................................. 361/600, 601, 361/604, 117, 118, 119, 120, 679, 752; D13/133, 184; 379/326, 327, 328, 325, 330, 331

(56) References Cited

U.S. PATENT DOCUMENTS

| | | | | | |
|---|---|---|---|---|---|
| 4,560,839 A | * | 12/1985 | Dillard | .................. | 379/413.02 |
| 4,614,844 A | * | 9/1986 | Leeper | .................... | 379/27.08 |
| 5,493,469 A | * | 2/1996 | Lace | .......................... | 361/119 |
| 5,568,355 A | * | 10/1996 | Verding et al. | ............. | 361/676 |
| 5,953,195 A | * | 9/1999 | Pagliuca | ..................... | 361/120 |

* cited by examiner

Primary Examiner—Bing Q. Bui
(74) Attorney, Agent, or Firm—Holland & Hart

(57) ABSTRACT

A telecommunications customer service terminal provides telecommunications service between a telecommunications line and a plurality of telephones and/or data processing devices. The customer service terminal includes a housing having a base. A first cover is secured to the base to form a sealed first compartment within the housing. A second cover is removably secured to the base to form an unsealed second compartment within the housing. A connection board is mounted within the second compartment and includes a plurality of insulation displacement connectors for the connection of telephone lines that extend external to the customer service terminal. An electronic board is mounted within the first compartment, and electronic components thereon are electrically connected to the insulation displacement connectors. A plurality of telephone line voltage surge protection devices are provided integrally with the insulation displacement connector assembly, one voltage surge protecting device for each of the insulation displacement connectors.

6 Claims, 11 Drawing Sheets

TELECOMMUNICATIONS CUSTOMER SERVICE TERMINAL HAVING ELECTRONIC COMPONENTS SEALED IN A FIRST COMPARTMENT AND HAVING AN UNSEALED COMPARTMENT THAT CONTAINS AN INSULATION DISPLACEMENT CONNECTOR BOARD THAT INCLUDES VOLTAGE SURGE PROTECTION

CROSS-REFERENCE TO RELATED APPLICATIONS

This non-provisional patent application claims the benefit of co-pending provisional patent application Ser. No. 60/279,910 filed Mar. 29, 2001 and entitled TELECOMMUNICATIONS CUSTOMER SERVICE TERMINAL, and is incorporated herein by reference as are the following co-pending United States patent applications:

Design patent application Ser. No. 29/138,901 filed Mar. 21, 2001 entitled TELECOMMUNICATIONS CUSTOMER SERVICE TERMINAL.

Non-provisional patent application Ser. No. 09/872,084 filed May 31, 2001.

Non-provisional patent application Ser. No. 09/872,382 filed Jun. 1, 2001.

Non-provisional patent application Ser. No 10/103,030 filed concurrently herewith entitled SEALED AND PASSIVELY COOLED TELECOMMUNICATIONS CUSTOMER SERVICE TERMINAL.

Non-provisional patent application Ser. No. 10/104,432 filed concurrently herewith entitled TELECOMMUNICATIONS CUSTOMER SERVICE TERMINAL HAVING A SEALED COMPARTMENT CONTAINING ELECTRONIC COMPONENTS AND AN UNSEALED COMPARTMENT CONTAINING CONNECTIONS TO EXTERNAL TELEPHONE LINES.

Non-provisional patent application Ser. No. 10/103,230 filed concurrently herewith entitled TELECOMMUNICATIONS CUSTOMER SERVICE TERMINAL HAVING ELECTRONIC COMPONENTS SEALED IN A FIRST COMPARTMENT AND HAVING AN UNSEALED COMPARTMENT THAT SELECTIVE CONTAINS A TELCO CONNECTION BOARD OR AN INSULATION DISPLACEMENT CONNECTION BOARD.

BACKGROUND OF THE INVENTION

1. Field of the Invention

This invention relates to the field of telecommunications, and more specifically to a telecommunications Customer Service Terminal (CST) (also known as a telecommunications integrated access device or IAD) that is operable to deliver carrier class analog voice and digital data to a telephone user, such as a home or a small business.

2. Description of the Related Art

Telecommunications Customer Service Terminals (CSTs), also known as Integrated Access Devices (IADs), are generally known.

However, the need remains in the art for a CST that is operable to supply both analog telephone service and digital data service to customers having relatively limited telecommunications needs; for example, a home or a small business.

SUMMARY OF THE INVENTION

The present invention provides a single line entry CST that receives operating power from a low-voltage direct current (DC) source; that receives telecommunications input signals from a Symmetrical Subscriber Line or SDSL (generically a digital subscriber line or DSL) that operates upon the telecommunications input signals to provide a plurality of analog telephone output lines individually adapted to be connected to conventional telephone terminal devices, and to provide at least one Ethernet output line adapted to be connected to at least one digital data terminal device; wherein conventional and readily-available telephone wire is used to connect the CST to its power supply, to its telecommunications signal input source, to its telephone terminal devices, and to its data terminal device(s).

The CST of this invention includes a metal housing (aluminum being preferred) that is adapted to be mounted upon a vertically-extending wall, partition or the like. Versions of this housing are constructed and arranged so that the CST can be either mounted within a building (i.e., mounted inside) or external to a building (i.e., mounted outside).

In an embodiment of the invention, the CST housing comprises a rectangular box shape whose long or major axis extends vertically, and whose short or minor axis extends horizontally when the housing is mounted upon a wall.

The CST housing is constructed and arranged to provide an upper inter-compartment having a cover that is sealed so as to prevent, or minimize, access by service personnel, and to provide a lower inter-compartment having a removably-pivoted cover that is readily openable for access by service personnel, but which can be latched closed by service personnel after installation of the CST.

Preferably, the CST upper compartment is constructed and arranged to be National Electrical Manufactures Association (NEMA) type 3 compliant, and the lower compartment is constructed and arranged to be NEMA type 3R compliant.

The back exterior surface of the CST housing (i.e., the housing surface that faces a vertical wall upon which the CST is mounted) includes a plurality, an array, or a matrix of external metal cooling fins that generally cover at least the external area of the above-described upper compartment. These cooling fins extend a common first distance outward from the back surface of the CST housing, and these fins are preferably thin and elongated fins that extend vertically upward.

The back surface of the CST housing also includes at least three triangular-positioned mounting legs that extend outward from the back surface of the housing by a common second distance that is greater than the above-described first distance. These mounting legs allow the CST housing to be mounted onto a wall with the back exterior surface of the housing and the cooling fins thereon, then being spaced from the adjacent surface of the wall.

The above-described cooling fins have an axis of elongation that extends generally vertical. Thus, heating of the cooling fins generates a passive and upward-moving laminar flow of air that operates to cool the CST metal housing A first planar circuit board is mounted within the housing lower inter-compartment so as to occupy a first plane that is relatively close to, and parallel to, the back internal surface of the housing. The upper edge of this first circuit board carries a first upward-facing strip connector. The upper edge of the first circuit board extends into the housing upper compartment.

This first strip connector is for use in electrically connecting the first circuit board to a second mating and downward-facing strip connector that is carried by the lower edge of a second planar circuit board that is mounted within the housing upper inter-compartment. This second circuit board occupies a second plane that is parallel to, and spaced above, the plane that is occupied by the first circuit board In the manufacture of the CST, the first circuit board is mounted within the lower compartment. Later, when the second circuit board is installed in the upper compartment, its downward-facing strip connector electrically connects with the first circuit board upward-facing strip connector.

The above-described first circuit board that is within the CST lower inter-compartment is selected from one of three difference first circuit boards, use of an individual one of these three first circuit boards being a function of the operational use that is selected for a particular CST being manufactured or installed.

A first type of first circuit board, intended for outdoor use, includes an insulation displacement connector (a Relco/Marconi punch-down block) that provides a connection point for input low voltage DC power, for the input DSL, for output telephone lines, and for at least one output data line.

A second type of first circuit board is similar to the above-described first type wherein the insulation displacement connector is constructed and arranged to provide primary voltage surge protection; for example, gas tube-type protection from a lightening strike. It is common practice to provide a Network Interface Device (NID) in telecommunications systems in order to provide primary voltage (for example, 110 VAC) surge protection between a common connection point whereat building internal and building external telephone lines are connected to each other. When this second type of first circuit board is used within the lower compartment of a CST in accordance with the invention, the need for such a NID is eliminated.

A third type of first circuit board is intended for indoor use, and this first circuit board includes a 25 pair Telco cable that terminates at a telco tip and ring connector, such as a RJ2X connector (i.e., a 25 pair polarized connector that is used to consolidate multiple voice and data lines), thus easing connection of the CST of a 25 pair cable of the type that is standard equipment within an installer's truck.

As is known, a Telco connector (also know as a Centronic connector or a SCSI 1 connector) is a 50-pin telecommunications connector.

As stated above, a second planar circuit board is mounted within the housing upper inter-compartment such that a planar back surface of the second circuit board is located closely adjacent to, but spaced from, the generally planar and inner metal surface of the housing. This second circuit board is mounted so that a lower edge thereof overlies the upper edge of the selected one of the three above-described first circuit boards, the second circuit board carrying a downward-facing second strip connector that mates with the above-described upward-facing first strip connector.

This second circuit board carries active electronic components that are common to use with any one of the three first circuit boards, and these electronic components operate to generate analog telephone outputs and digital data output (s) from the DSL telecommunications input signals.

Both the first and the second circuit board have a generally square, thin and planar shape. The second circuit board is constructed and arranged such that the circuit components that generate the most heat are arranged on the periphery of the second circuit board (i.e., the hottest circuit components are arranged on the periphery of the second circuit board), whereas circuit components that generate less heat are located generally in the center of the second circuit board (i.e., the coolest circuit components are arranged in the center of the second circuit board).

These hot or major heat-generating circuit components serve various electronic functions, and the physical dimensions of these circuit components are such that at least some of them extend different distances from the two planar sides of the second circuit board. More specifically, at least some portions of the major heat-generating components that face the closely-adjacent back internal surface of the metal housing extend different distances from the back planar surface of the second circuit board; i.e., from the surface of the second circuit board that faces the back internal surface of the metal housing.

In order to maximize the transfer of heat from these major heat-generating circuit components to the closely adjacent back internal surface of the metal housing, the internal topography of this closely-adjacent internal metal surface is profiled to complement the topography of the adjacent circuit components, thus providing generally the same spacing between all circuit components and the back internal surface of the housing. A plurality of resilient heat-transferring pads, all having a common thickness, are then located between the closely adjacent internal metal surface and the adjacent surface of these circuit components. In this way, passive cooling of the second circuit board is improved.

DESCRIPTION OF THE PREFERRED EMBODIMENTS

Figure 1:
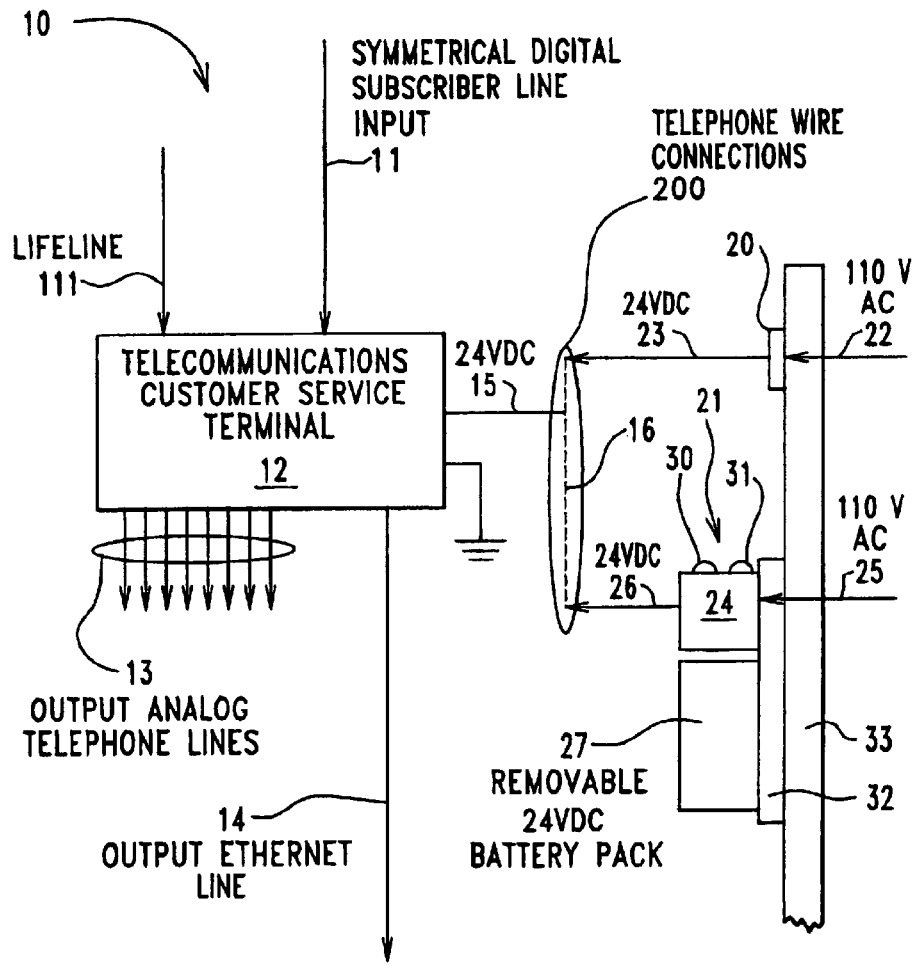
FIG. 1 shows a telecommunications system that includes the CST of this invention.

FIG. 1 is a non-limiting example of a single line input telecommunications system 10 wherein a CST 12 in accordance with the present invention finds utility Telecommunications input to system 10 is provided by way of a Symmetrical Digital Subscriber Line (SDSL) 11. CST 12 is a scalable integrated access device (AID) that provides integrated voice and data services to a customer's premises over SDSL 11.

CST 12 operates upon SDSL telephone wire input 11 to provide a plurality of analog telephone wire outputs 13 that are adapted to be connected to a like plurality of conventional telephone terminals or handsets (not shown). CST 12 also operates on input 11 to provide at least one digital telephone wire output 14 to at least one digital data terminal (not shown).

SDSL 11 is a type of Digital Subscriber Line (DSL) that is similar to high-bit rate HDSL wherein a single twisted pair line carries 1.544 Mbps (U.S. and Canada) or 2.048 Mbps (Europe) in each direction on a duplex line that is symmetric because the data rate is the same in both directions.

DSL is a technology for bringing high bandwidth information to homes and small businesses over ordinary copper telephone lines wherein xDSL refers to different variations of DSL, such as, but not limited to, ADSL, CDSL, HDSL, IDSL, RADSL, SDLS, UDSL, and VDSL. A DSL can carry both data and voice signals wherein the data part of the line is continuously connected.

While telecommunications system 10 will be described as having a SDSL input 11, input 11 can be virtually any type of DSL.

Grounded input power is applied to CST 12 by a 24 VDC telephone wire 15. As shown by dotted line 16, this 24 VDC power 15 is optionally supplied by a first wall-mounted power supply 20 or by a second wall-mounted battery pack power supply 21 as described in above-mentioned U.S. non-provisional patent application Ser. No. 09/872,382 filed Jun. 1, 2001, incorporated herein by reference Power supply 20 is of a type that receives a high-voltage input, such as 110 VAC input 22, and operates to supply a low-voltage output, such as 24 VDC, on telephone wire 23.

Battery pack power supply 21 includes a first component 24 that operates similar to power supply 20. That is, as long as 110 VAC input 25 to power supply 24 remains active, 24 VDC telephone wire output 26 of component 24 remains active. In addition, battery pack power supply 21 includes a manually-replaceable 24 VDC battery pack 27 that constitutes an eight-hour backup power supply for component 24.

Circuitry within component 24 operates to activate a battery state indicator 30 in accordance with the state of charge of 24 VDC battery pack 24, and operates to activate another indicator 31 in accordance with the active/inactive state of 110 VAC input 25.

Power supply 21 is constructed and arranged so that when indicator 30 indicates the need to manually remove and replace the 24 VDC battery pack 27 that is currently resident on base 32, and when indicator 31 indicates that 110 VAC input 25 is active, that particular battery pack 27 can be removed and replaced with a fully-charged battery pack 27. As long as 110 VAC input 25 to battery pack power supply 21 remains active, this removal and replacement of battery packs 27 does not interrupt the operation of CST 12.

In this construction and arrangement of telecommunications system 10, all wiring, including telephone wire connections 200, with the exception of 110 VDC inputs 22 and 25, is American Wire Gage telephone wiring that is readily available to telecommunications workers who are building or connecting system 10, as is described in above-described U.S. non-provisional patent application Ser. No. 09/872,084 filed May 31, 2001, incorporated herein by reference.

CST 12 and power supply 20 or power supply 21 are adapted to be mounted in relatively close proximity to each other; for example, inside on a wall 33. Optionally, housing of CST 12 is constructed and arranged for mounting outside In the event of a failure of CST 12 to support service to output analog telephone lines 13 and output Ethernet line 14, a lifeline 111 is provided to support party-line type service to analog telephones that are connected to telephone lines 13. This party-line type service is such that the first of the analog telephones to go off-hook captures lifeline 111. During use of lifeline 111 by this first user, other users of analog telephones that subsequently go off-hook can determine that lifeline 111 is busy by hearing the conversation of the first user.

In an embodiment of the invention, DC power input 15 and 23, or 15 and 26 was a two conductor line, SDSL line 11 was a four conductor line, lifeline 111 was a two conductor line, Ethernet line 14 was a four conductor line, and each of the analog telephone lines 13 were two conductor lines.

Figure 2:
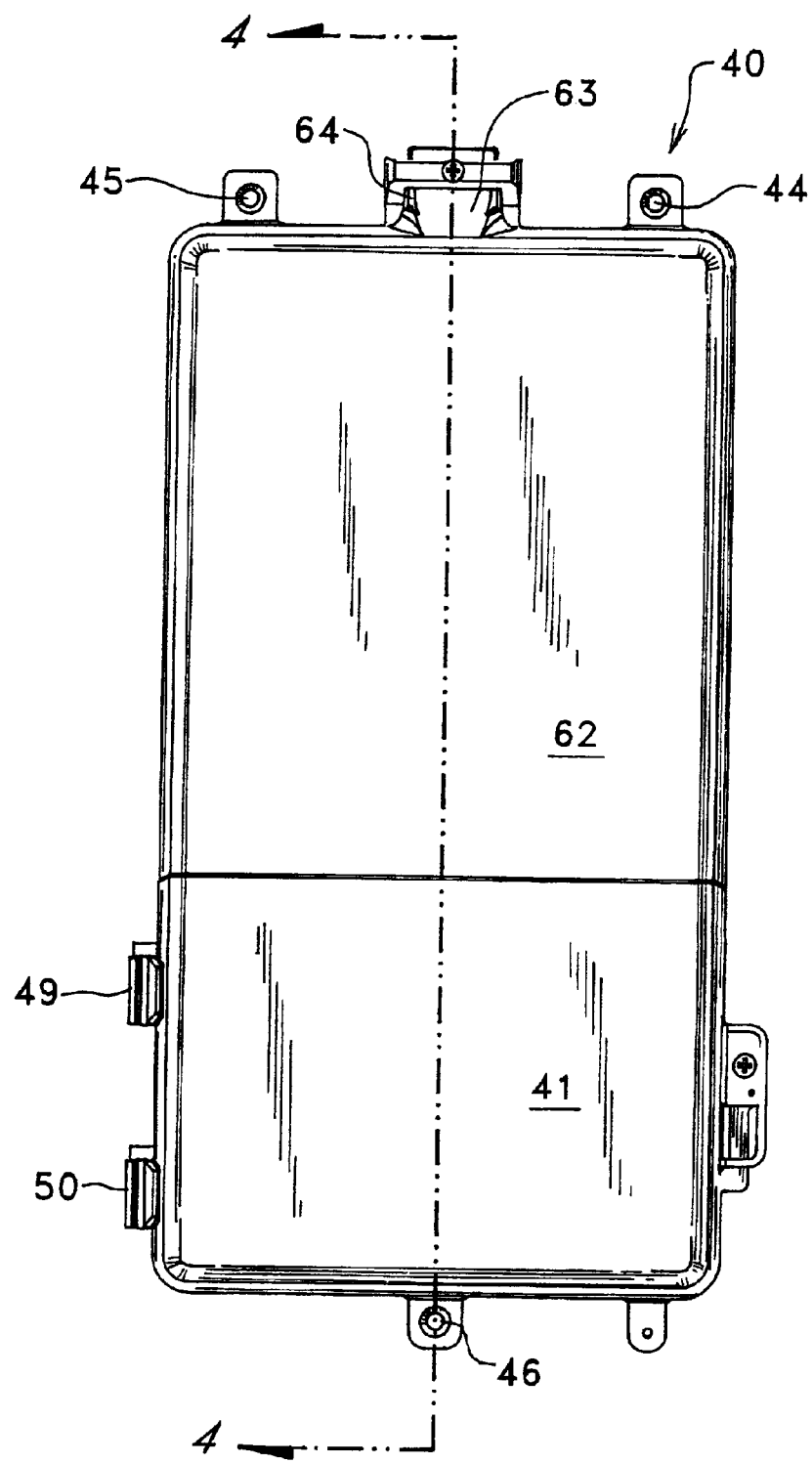
FIG. 2 is a front view of a CST embodying the invention, this figure showing a manually-removable hinged cover that covers a lower inter-compartment that is within the CST, and this figure showing the housing two top-located mounting legs and one bottom-located mounting leg.

FIG. 2 is a front view of FIG. 1 CST 12.

CST 12 includes a metal, box-like housing 40, preferably aluminum, having a manually-removable hinged cover 41 that covers a lower inter-compartment 42 (see FIG. 4) that is within housing 40. The back surface 43 of housing 40 (see FIG. 4) includes at least two top-disposed mounting legs 44 and 45, and at least one bottom-disposed mounting leg 46.

Figure 3:
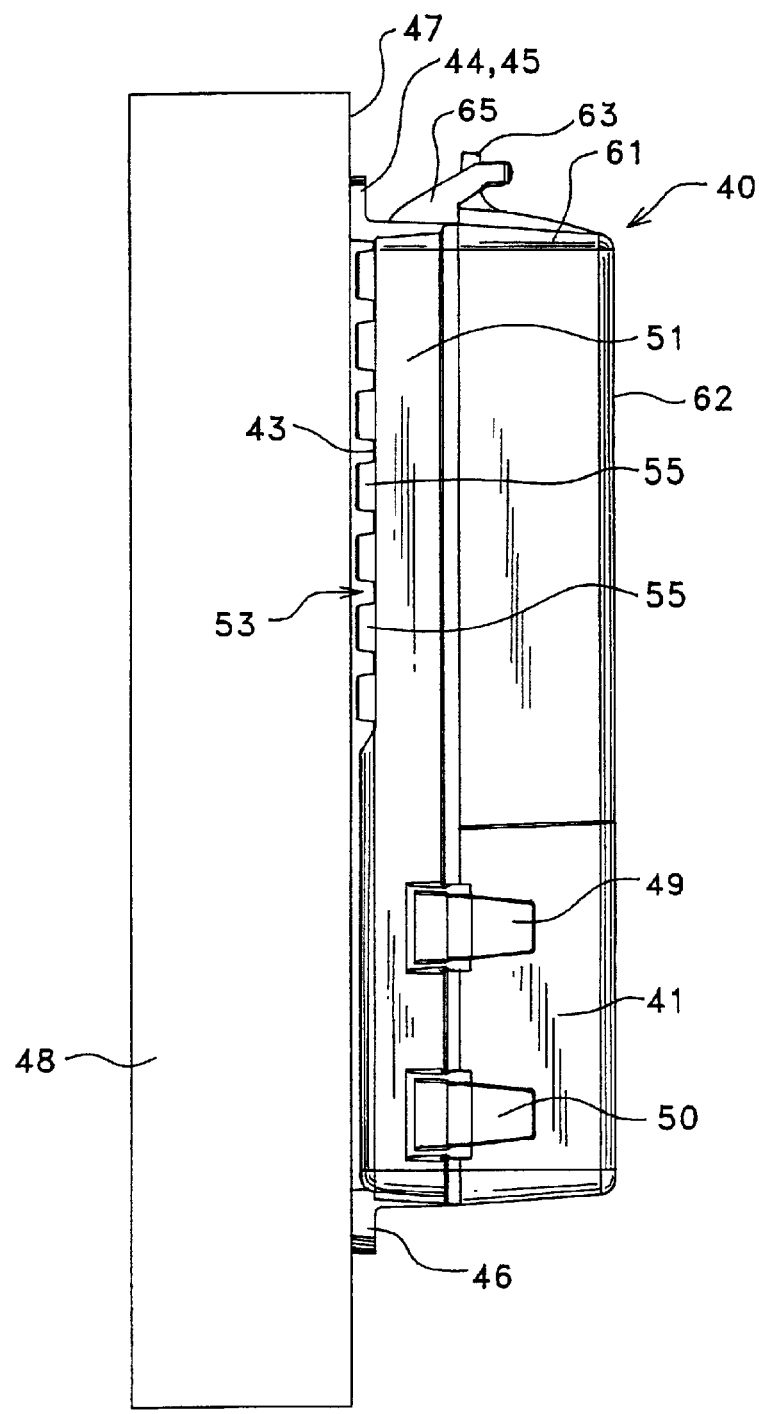
FIG. 3 is a left-side view of the CST of FIG. 2 wherein the CST has been mounted on a vertically-extending wall, this figure showing an array of vertically-extending cooling fins that are located adjacent to the wall so as to generally coincide with the location of an upper inner compartment that is within the CST housing, this figure showing how the top surface of the housing top cover contains an upward-extending tab that extends into a slot that is carried by the top horizontally-extending wall of the housing, and this figure showing hinges that support the housing bottom cover.

As shown in FIG. 3, the three triangle-disposed mounting legs 44–46 are used to mount housing 40 onto the flat and vertical inside or outside surface 47 of a wall or partition 48.

Without limitation thereto, housing 40 has a vertical height of about 17.625-inches and a horizontal width of about 8.3-inches, housing 40 is about 4.25-inches deep, and the three mounting legs 44–46 are about 0.75-inches long, thus providing a relatively thin and upwardly-extending air space 53 (see FIG. 3) between the back surface 43 of housing 40 and the adjacent surface 47 of wall 48.

As will be apparent, heat-generating electronic or electrical components that are within housing 40 are placed in thermal contact with the housing back surface 43 to provide for an efficient transfer of heat to back surface 43 and then to a flow of air that passes through the upward-extending air space 53 that exists between the back surface 43 of housing 40 and the adjacent surface 47 of wall 48.

Lower cover 41 is supported by two hinges 49 and 50 that are constructed and arranged such that lower cover 41 can be manually-removable from hinge pins 52 (see FIGS. 7 and 8) that are carried by the box-shaped base portion 51 of housing 40.

FIG. 3 is a left-side view of housing 40 wherein housing 40 has been mounted on the surface 47 of vertically-extending wall 48. FIG. 3 shows a rectangular array of cooling fins 55 that extend out from the back surface 43 of housing 40, so as to be located adjacent to, but out of physical contact with, the surface 47 of wall 48. Fin array 55 is cooled by air that flows through air space 53, this air flow being induced by buoyancy forces and by the close proximity of the back surface 43 of housing 40 to the wall mounting surface 47. In this manner, heat-generating components that are in thermal flow contact with the back surface 43 of housing 40 are passively cooled.

By way of a non-limiting example, in an embodiment of the invention cooling fin array 55 was a row/column array having seven horizontal rows and nineteen vertical columns. The center-to-center horizontal spacing of the cooling fin columns was about 0.4-inch, the center-to-center vertical spacing of the cooling fin rows was about 1.0-inch, each of the fins 55 had a vertical length of about 0.75-inches and a horizontal width of about 0.2-inches, and each of the fins extended about 0.4-inch from the housing back surface 43 toward the surface 47 of wall 48.

Preferably, the construction and arrangement of the housing back surface 43, legs 44–46, and fin array 55 (see FIG. 3) is such that this upward flow of air is a laminar flow of air.

The array of cooling fins 55 is positioned on the back surface 43 of housing 40 so as to generally coincide with the location of an upper inner-compartment 60 that is contained within housing 40.

In the case of a housing 40 that is mounted outside, fin array 55 is contained within air space 53 in a manner to be essentially shielded from the heating effects of the sun; i.e., fin array 55 is shaded by housing 40. Preferably, housing 40 is of a light color (for example, bare aluminum) so as to minimize the heating effect of the sun.

The top surface 61 of the housing top cover 62 contains an upward-extending tab 63 that extends into a slot 64 (see FIG. 2) that is carried by the top horizontally-extending wall 65 of housing 40.

FIG. 3 also provides a side view of the two hinges 49 and 50 that support the housing bottom cover 41.

Figure 4:
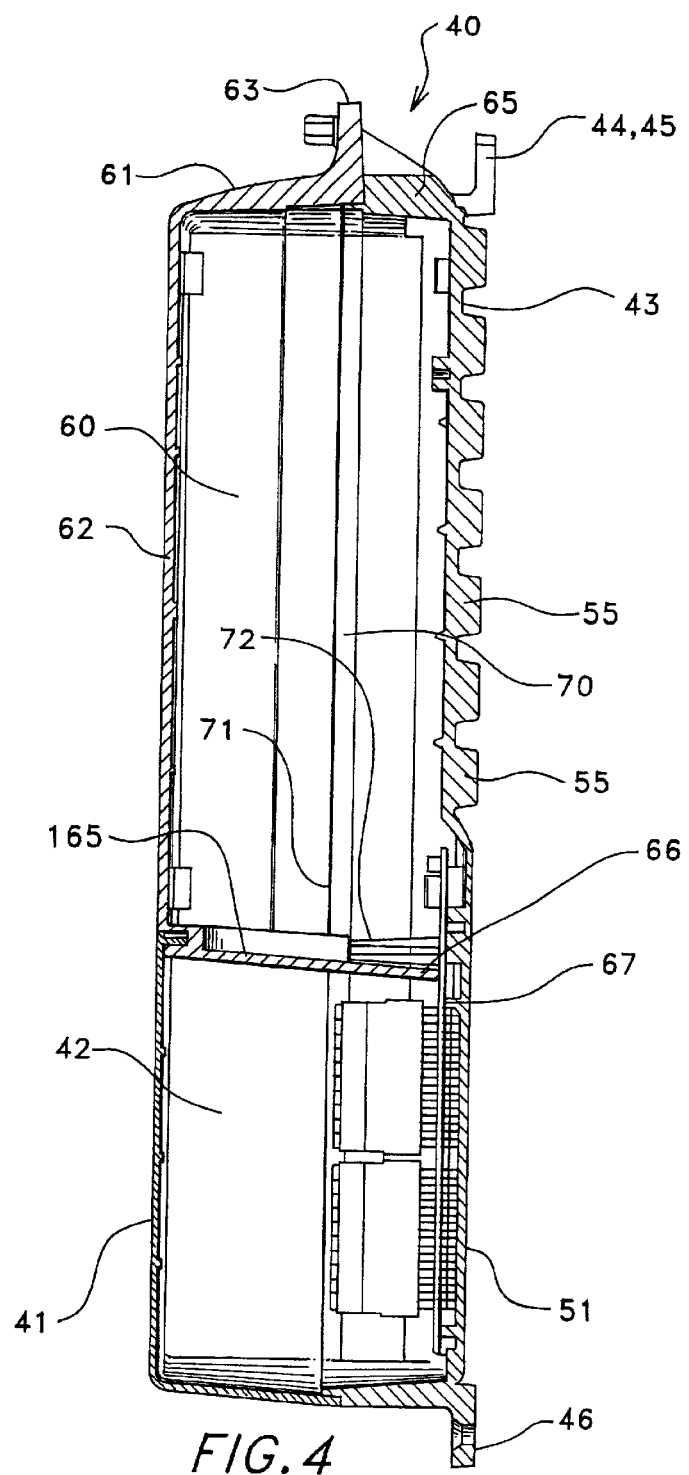
FIG. 4 is a section view that is taken along the line 4—4 of FIG. 2, this figure showing the housing top inner compartment that is sealed from the environment, this figure showing the housing lower inner compartment that is not sealed from the environment, this figure showing a horizontally-extending divider wall that is formed at the bottom of the top cover, this divider wall serving to define the lower wall of the housing upper inner compartment and the upper wall of the housing lower inner compartment, this figure showing a first printed circuit board that is mounted within the lower inner compartment so that the upper edge of the first printed circuit board extends into the upper inner compartment, and this figure showing a second circuit board that is mounted within the upper inner compartment, such that its lower edge overlies the upper edge of the first circuit board.

FIG. 4 is a section view that is taken along the line 4—4 of FIG. 2. FIG. 4 shows the housing top inner compartment 60 that is sealed from the environment, as well as the housing lower inner compartment 42 that is generally not sealed.

The top inner compartment 60 is completed by a horizontally-extending divider wall 165 that is formed at the bottom of top cover 62. The extending edge 66 of divider wall 165 is screw fastened to the back surface 43 of housing 40, as is shown at 265 in FIGS. 7 and 8. Divider wall 165 serves to define the lower wall of the housing upper inner compartment 60, and the upper wall of the housing lower inner compartment 42.

Figure 13:
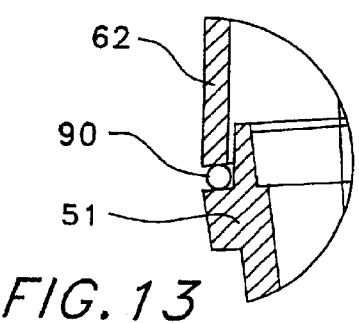
FIG. 13 shows a sealing gasket that may be provided along the three outer edges of the CST top cover at a location that is intermediate the top cover and a base portion of the housing, to thereby seal the housing upper inner compartment from the environment.

If desired, and as shown in FIG. 13, a downward-facing or inverted U-shaped gasket 90 may be provided along the top horizontal edge and the two vertical side edges of top cover 62 that engage the housing base portion 51 thus more effectively sealing upper inner-compartment 60 from the environment.

Figure 10:
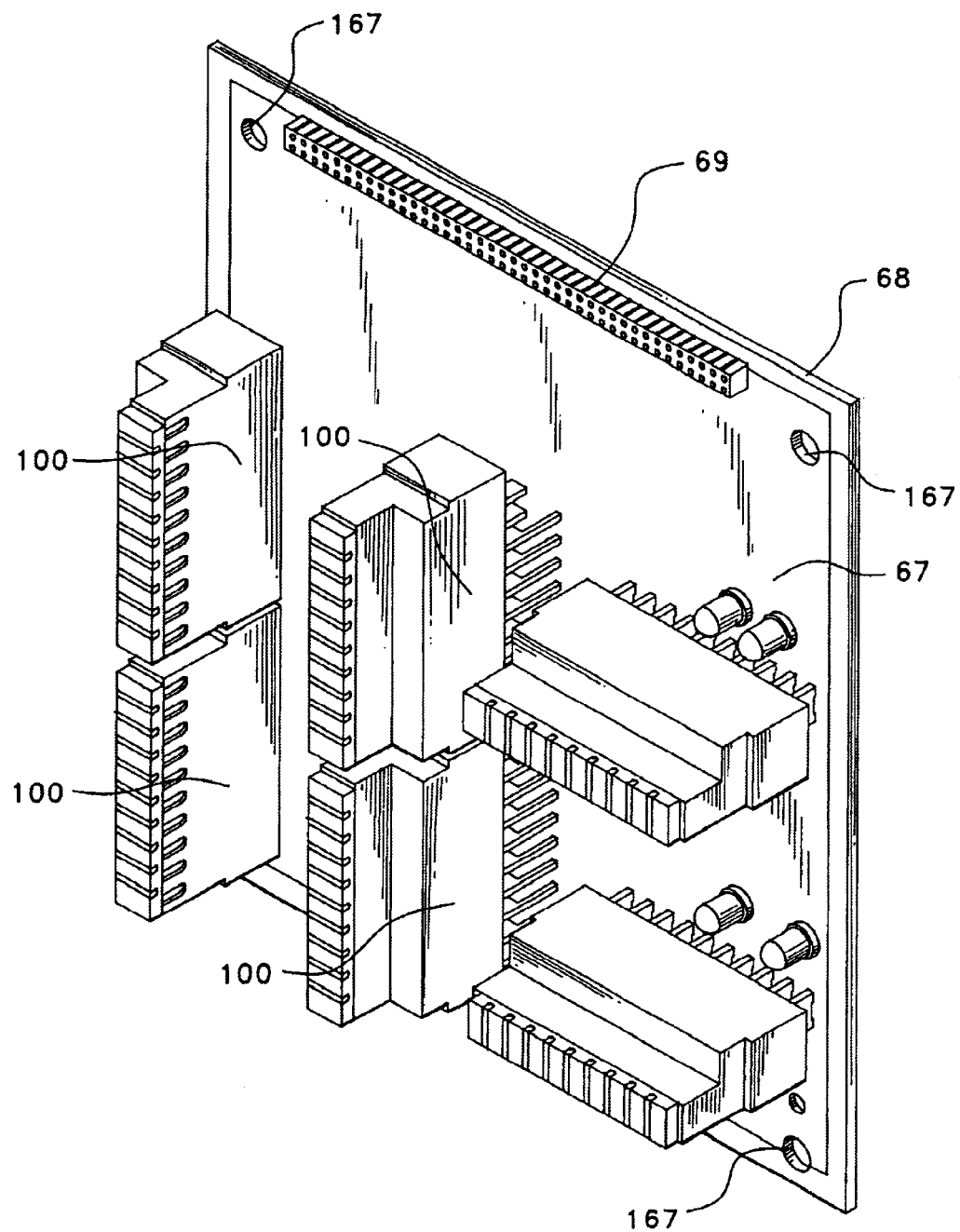
FIG. 10 is a front view of the Reltec-type printed circuit board of FIG. 8.

FIG. 4 also shows a first circuit board 67 that is located in lower inner-compartment 42 of housing 40 (also see FIG. 10)

Figure 5:
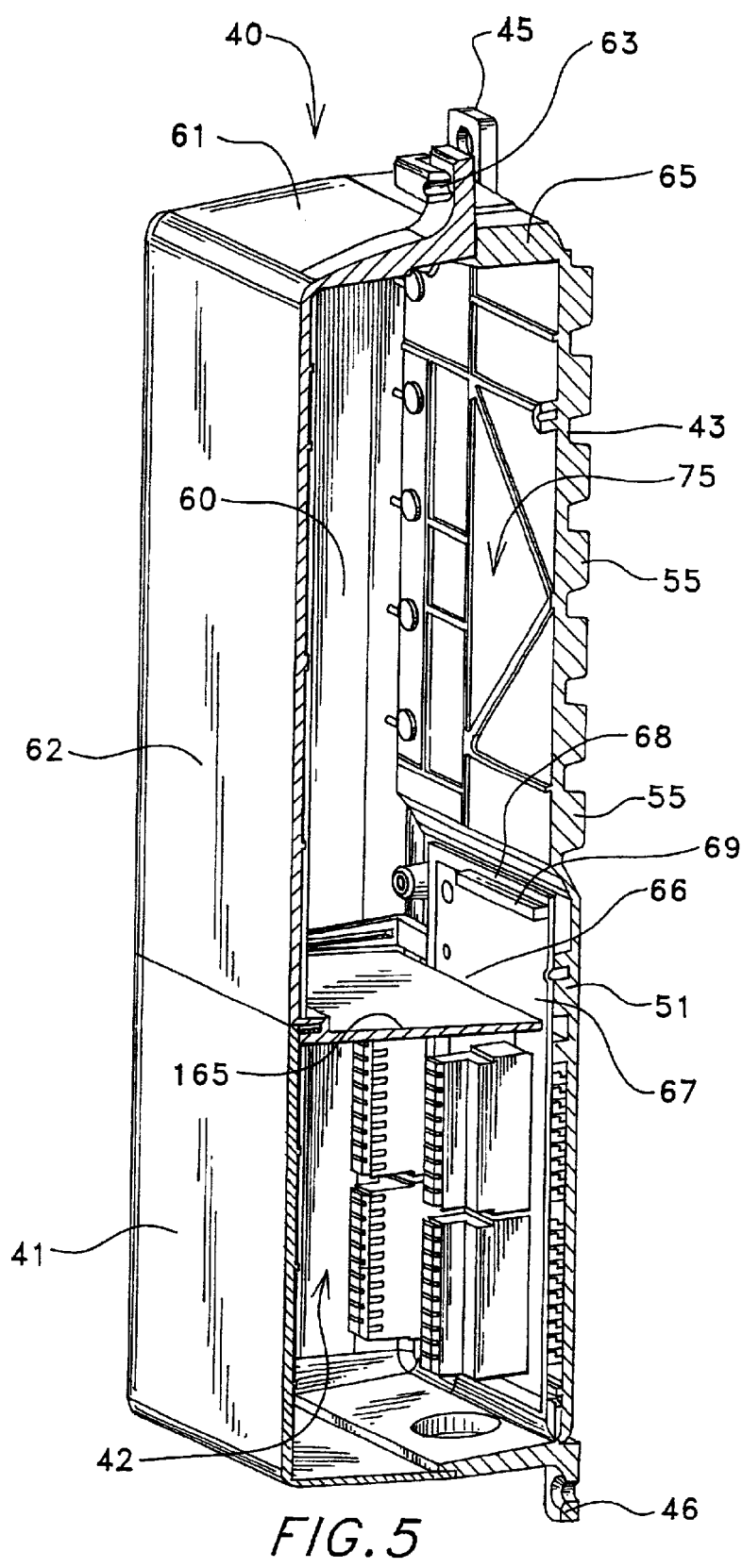
FIG. 5 is a perspective section view that is similar to FIG. 4 wherein the second circuit board has been removed to show the internal topography of the housing back wall.

As best seen in FIG. 5, first circuit board 67 includes an upper edge portion 68 that extends upward and into the housing upper inner compartment 60. The upper edge portion 68 of first circuit board 67 carries an upward-facing strip connector 69. Note that first circuit board 67 is a relatively thin and planar member that is screw mounted to the back surface 43 of housing 40, and whose plane lies relatively close to, and generally parallel to, the back surface 43 of housing 40.

FIG. 4 also shows a second or main circuit board 70 that is totally contained within the housing upper inner compartment 60. The lower edge portion 71 of second circuit board 70 carries a downward-facing strip connector 72 that mates with the upward-facing strip connector 69 that is carried by the upper edge portion 68 of first circuit board 67. Note that second circuit board 70 is also a relatively thin and planar member that is screw-mounted to the back surface 43 of housing 40, and whose plane extends generally parallel to, and above, the plane that is occupied by first circuit board 67.

In the process of manufacturing CST 12, first circuit board 67 is first mounted within the housing lower inner compartment 42. Second circuit board 70 is then mounted within the housing upper inner compartment 60. This mounting of second circuit board 70 effects an electrical connection between strip connector 69 and strip connector 72.

The back surface 43 of housing 40 includes positioning posts (not shown) upon which the first and second circuit boards 67 and 70 rest, these positioning posts being useful in achieving the proper planar positioning of the two circuit boards during assembly of circuit boards 67 and 70 to housing 40. Circuit boards 67 and 70 may include positioning holes that facilitate locating the circuit boards within housing 40, for example, see positioning holes 167 in FIGS. 9 and 10.

FIG. 5 is a perspective view that is similar to FIG. 4 wherein the second circuit board 70 has been removed to show the internal topography 75 of the housing back wall or surface 43. This internal topography 75 provides an optimum heat flow path between circuit components that are carried by second circuit board 70 and cooling fin array 55.

Figure 6:
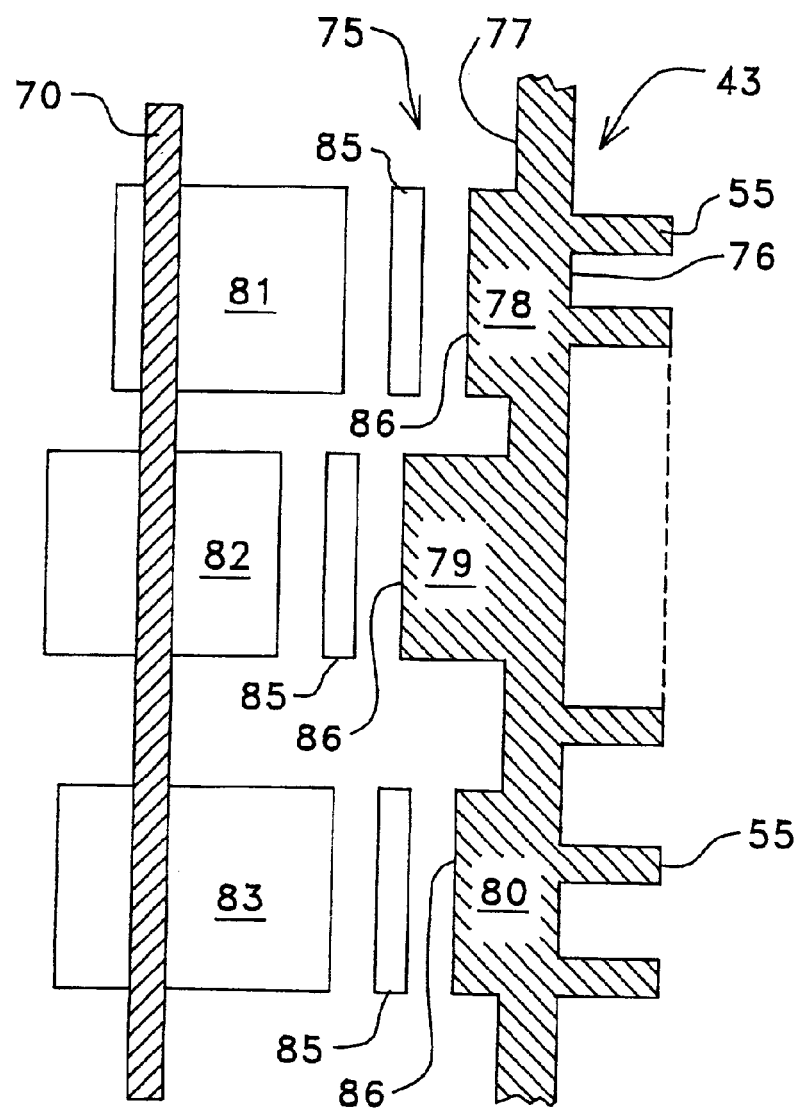
FIG. 6 is an enlarged exploded view that shows a portion of the housing back wall, the outer surface of this back wall containing cooling fins and the inner surface of this back wall containing three raised topography portions that correspond to the location of three heat-generating circuit components that are carried by boarder, or edge portions of the second circuit board, the three circuit components extending varying distances toward this inner surface, and showing three heat-transmitting and resilient pads that separate each circuit component from its complementary topographic housing portion.

FIG. 6 is an enlarged exploded view that shows a portion of the housing back wall 43, the outer surface 76 of back wall 43 containing cooling fin array 55. The inner surface 77 of back wall 43 contains a number of inwardly-extending topography portions 78, 79 and 80 that correspond to the location of a like number of heat-generating circuit components 81, 82 and 83 that are carried by boarder or edge portions of second circuit board 70.

These three circuit components 81–83 extend varying distances toward the inner surface 77 of the back surface 43 of housing 40. The mating topography portions 79–80 that are contained on the inner surface 77 of back wall 43 respectively complement these varying distances.

Within the spirit and scope of the invention, the manufacturing tolerances of topographic portions 78–80 and circuit components 81–83 may be such as to place these respective members generally in physical engagement. However, as a feature of the invention, and in order to enhance the heat flow from circuit components 81–83 to mating ones of the topographic portions 78–80, each of the three mating topography portions 79–80 contain at least one resilient heat-transmitting pad 85 that is secured (as by using glue) to the top surface 86 of each of the three topographic portions 79–80.

When second circuit board 70 is fastened into position within the upper inner compartment 60 of housing 40, each of the three pads 85 is somewhat compressed, thus ensuring a good heat flow path between a circuit component 81–83 and its mating topographic portion 78–80.

Figure 7:
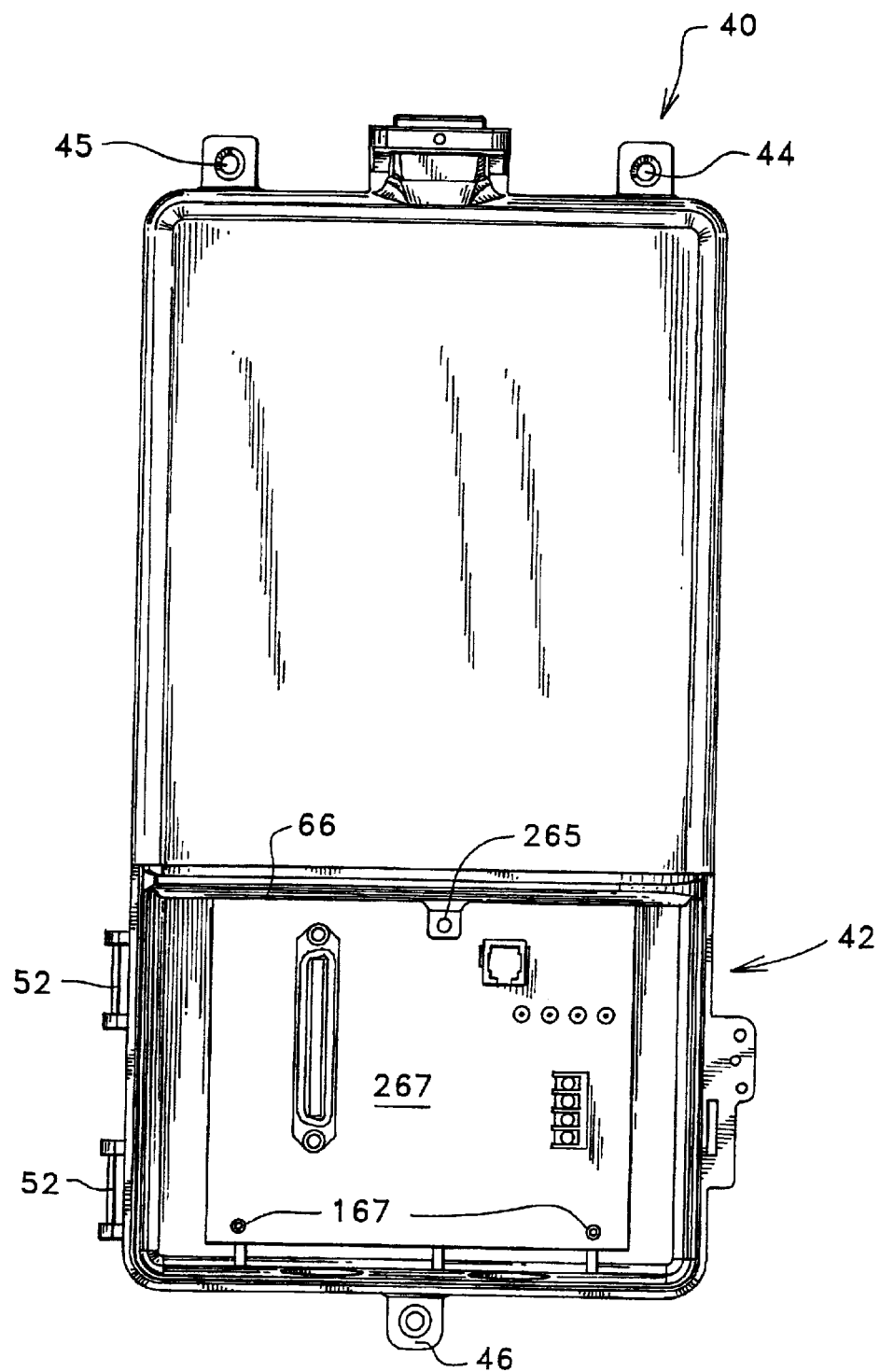
FIG. 7 is a figure similar to FIG. 2 wherein the housing bottom cover has been removed to expose a Telco-type first circuit board within the housing lower inner compartment, this type of first circuit board being for indoor use.

FIG. 7 is a figure similar to FIG. 2 wherein the housing bottom cover 41 has been removed to expose a Telco-type first circuit board 267 within the housing lower inner compartment 42, this type of first circuit board being for indoor use of CST 12, and this type of first circuit board having a Telco connector 268.

Figure 9:
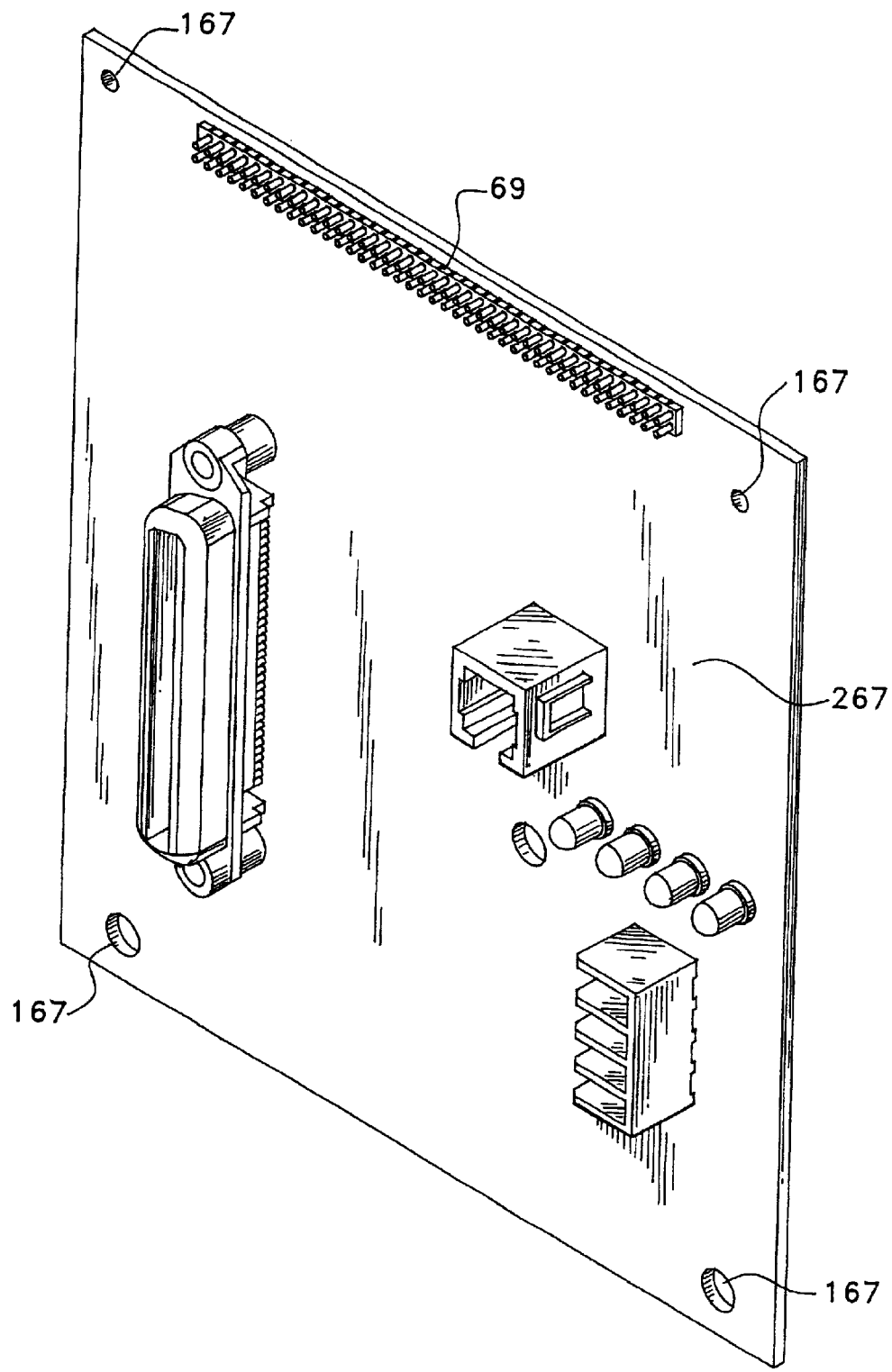
FIG. 9 is a front perspective view of the Telco-type printed circuit board of FIG. 7.

Telco circuit board 267 is also shown in FIG. 9 wherein four holes 167 are shown. Holes 167 cooperate with four positioning posts that are carried within the lower inner compartment of housing of CST 12, and these holes aid in the proper positioning of Telco circuit board 267 within the lower inner compartment.

Figure 8:
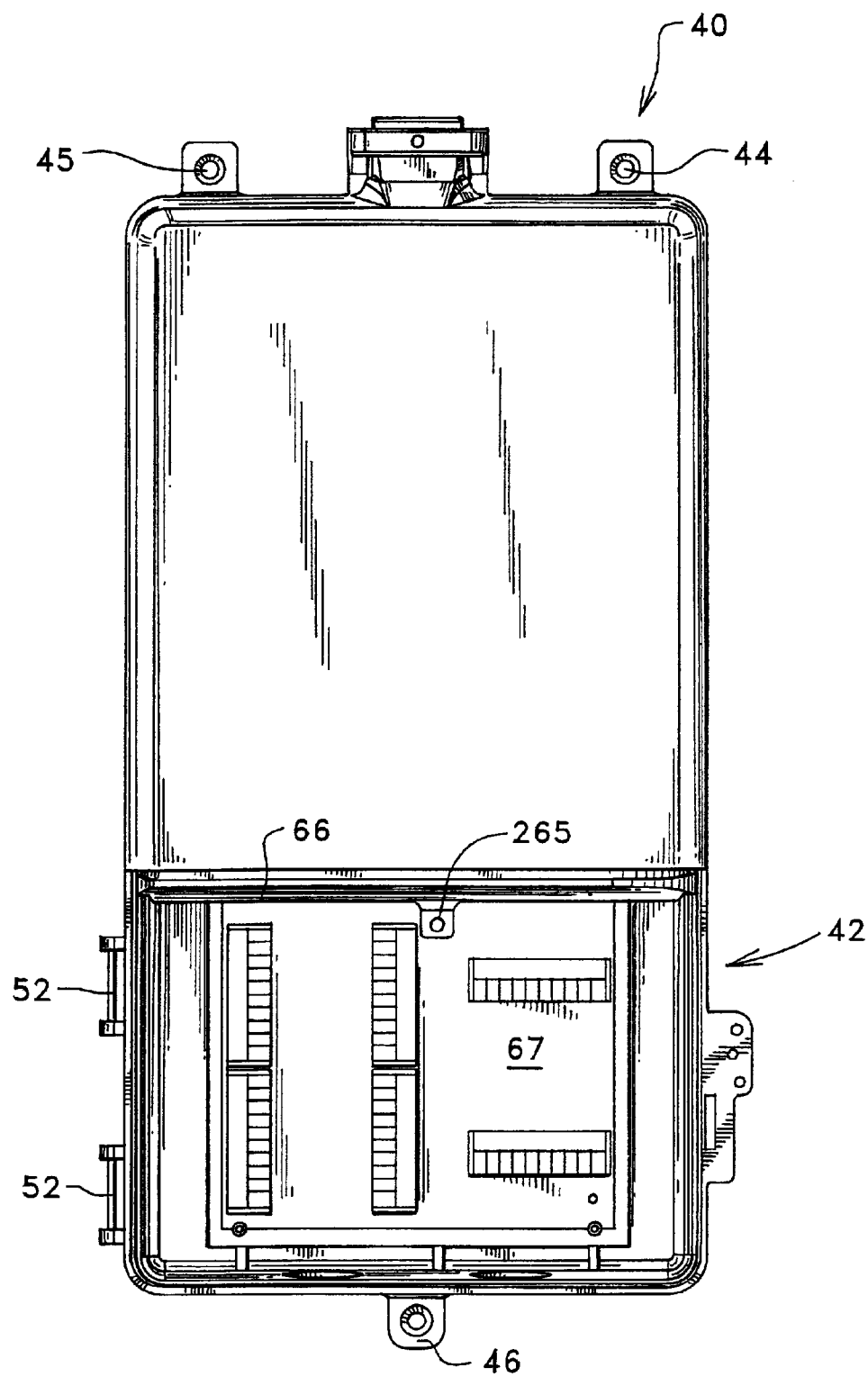
FIG. 8 is a figure similar to FIG. 2 wherein the housing bottom cover has been removed to expose a Reltec-type first circuit board within the housing lower inner compartment, this type of first circuit board being primarily intended for outdoor use but also being usable indoors.

FIG. 8 is a figure similar to FIG. 2 wherein the housing bottom cover 41 has been removed to expose a Reltec-type first circuit board 67 within the housing lower inner compartment 42, this type of first circuit board being primarily intended for outdoor use, but also being usable indoors.

Figure 11:
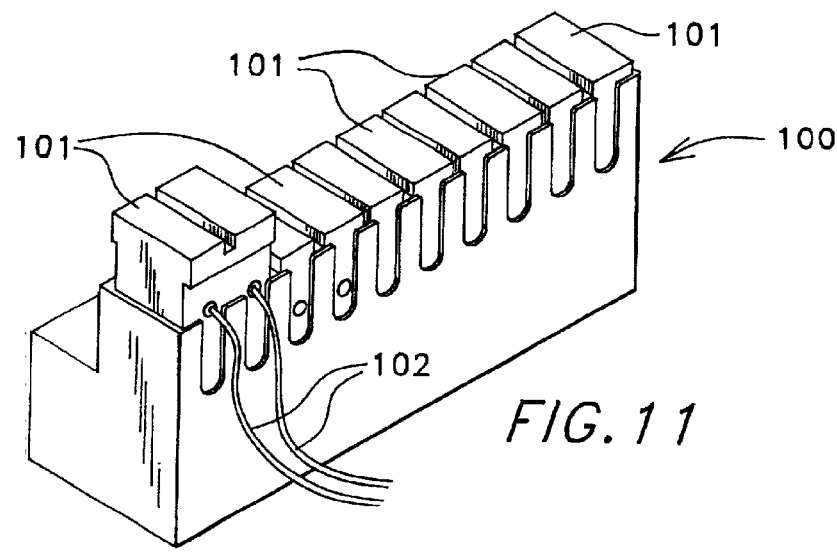
FIG. 11 shows a weather-resistant insulation displacement connector of the type that is used on the indoor/outdoor first circuit board of FIGS. 8 and 10.

In accordance with a feature of the invention, and in case of the Reltec-type circuit board 67 of FIG. 8, all wiring connections to the circuit board are made by way of insulation displacement connectors 100, one of which is shown in greater detail in FIG. 11 Insulation displacement connectors 100 do not require wire stripping Rather a two-position, two wire, clamp 101 is first manually pulled upward, and the insulated ends of two wires 102 are then inserted into holes that are now exposed in wire clamp 101. Wire clamp 101 is then manually pushed downward until the top of the wire clamp 101 is level with the other wire clamps 101. This operation operates to mechanically secure wires 102 to the insulation displacement connector, and to provide an electrical connection to the metal leads that are generally centered within wires 102.

Figure 12:
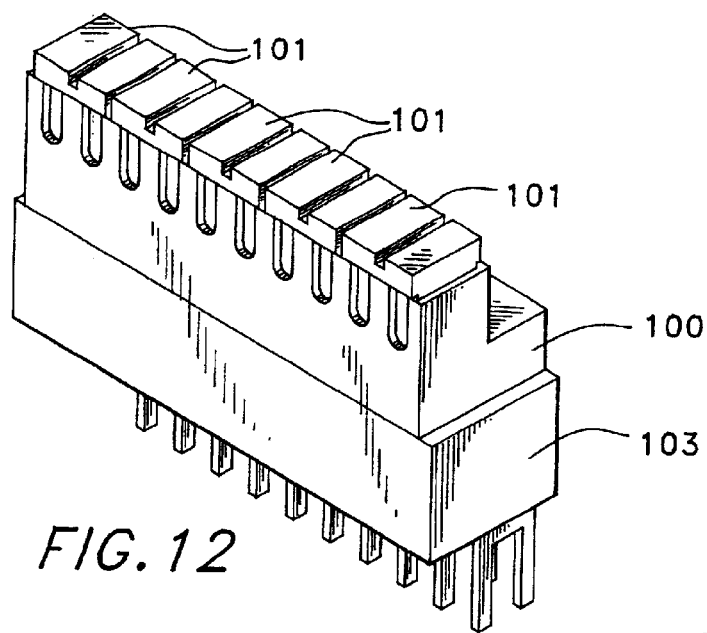
FIG. 12 shows a weather-resistant insulation displacement connector of the type shown in FIG. 11 wherein the connector includes a gas tube-type surge protection portion.

In accordance with another feature of the present invention, at least some of the insulation displacement connectors 100 carried by Reltec-type circuit board 67 are constructed and arranged to provide primary voltage surge protection to CST 12; for example, protection from a lightening strike, this protection being provided by gas tube-type protection block 103 in FIG. 12.

The present invention has been described in detail while making reference to embodiments thereof. However, this detailed description is not to be taken as a limitation on the spirit and scope of this invention.

What is claimed is:

1. A telecommunications customer service terminal for providing telecommunications service between a telecommunications line and a plurality of telephones and/or data processing devices, including:
   a housing having a base;
   a first cover secured to said base in a manner to form a generally sealed first compartment within said housing;
   a second cover removably secured to said base in a manner to form a generally unsealed second compartment within said housing, said unsealed second compartment being physically located adjacent to said generally sealed first compartment;
   a connection board mounted within said second compartment;
   a plurality of insulation displacement connectors on said connection board for direct connection of telephone lines that extend external to said customer service terminal;
   a plurality of voltage surge protection devices, one voltage surge protection device for each of said plurality of insulation displacement connectors, said insulation displacement connectors being integral with said insulation displacement connectors to thereby providing voltage surge protection for said plurality of insulation displacement connectors; and
   an electronic board mounted within said first compartment having a plurality of electronic components thereon electrically connected to said insulation displacement connectors on said connection board in a manner to maintain said first compartment generally sealed.

2. The customer service terminal of claim 1 wherein said voltage surge protection devices are mounted integrally with said insulation displacement connectors to thereby form a unitized assembly of voltage surge protection devices and insulation displacement connectors.

3. The customer service terminal of claim 2 wherein said voltage surge protection devices are gas tube type voltage surge protection devices.

4. The customer service terminal of claim 1 wherein said generally sealed first compartment is constructed and arranged to provide a NEMA type 3 compliant first compartment.

5. The customer service terminal of claim 4 wherein said generally unsealed second compartment is constructed and arranged to provide a NEMA type 3R compliant second compartment.

6. The customer service terminal of claim 5 wherein said voltage surge protection devices are gas tube type voltage surge protection devices.

* * * * *